United States Patent

Strehler et al.

[15] 3,703,226
[45] Nov. 21, 1972

[54] SHIFTABLE FRICTION CLUTCH

[72] Inventors: Richard Strehler, Unterfohring; Hans Eichinger; Julius Hubl, both of Munich, all of Germany

[73] Assignee: Carl Hurtl, Maschinen-und Zahnradfabrik, Munich, Germany

[22] Filed: Feb. 8, 1971

[21] Appl. No.: 113,505

[30] Foreign Application Priority Data

Sept. 14, 1970 Germany..........P 20 45 383.2

[52] U.S. Cl. .............. 192/48.91, 192/54, 192/70.23, 192/93 A
[51] Int. Cl. .......................F16d 21/06, F16d 13/42
[58] Field of Search...192/48.91, 52, 54, 70.23, 93 A

[56] References Cited

UNITED STATES PATENTS

| | | | |
|---|---|---|---|
| 2,547,732 | 4/1951 | Baker | 192/48.91 X |
| 2,658,593 | 11/1953 | Doebeli | 192/48.91 X |
| 2,146,044 | 2/1939 | Wolfram | 192/70.23 X |
| 2,081,824 | 5/1937 | Lambert | 192/70.23 X |
| 2,861,665 | 11/1958 | Passler | 192/54 X |
| 3,064,455 | 11/1962 | Gros | 192/54 X |
| 3,118,292 | 1/1964 | Schroter et al. | 192/54 X |

*Primary Examiner*—Allan D. Herrmann
*Attorney*—Woodhams, Blanchard & Flynn

[57] ABSTRACT

Friction clutch means including interleaved compressible friction plates and selectively operable means effecting compression thereof. One aspect of the invention relates to the means utilizing torque generated between the parts to be clutched for providing the compression force to be applied to the plates. Ball and ramp means are provided between driving and driven parts responding to torque initially applied to the driving member for generating an axial force which is then applied to the plate compressing means. Torque limiting means are provided in the force train to prevent transmission of excessive torques. Positive means are provided for preventing relative movement of the pressure generating parts when the clutch is in the disengaged condition whereby to insure against a tendency for a residual compression force to be applied during idling conditions.

Another aspect of the invention relates to means for shifting the shift collar. Here an eccentric is provided between the arms of a U-shaped yoke, said yoke being connected conventionally to the shift collar. Said eccentric has two pressure points, one on a relatively short radius for bearing against one side of said yoke and a second on a longer radius for bearing against the same side of said yoke upon further rotation of the eccentric. Thus, engagement of the eccentric starts with a smaller radius arm for application of greater force to the yoke and subsequently engages at a larger radius for more rapid movement thereof.

17 Claims, 13 Drawing Figures

PATENTED NOV 21 1972

Inventors
RICHARD STREHLER
HANS EICHINGER
JULIUS HÜBL

BY Woodhams, Blanchard & Flynn
ATTORNEYS

Inventors
RICHARD STREHLER
HANS EICHINGER
JULIUS HUBL
BY Woodhams, Blanchard & Flynn
ATTORNEYS

3,703,226

SHIFTABLE FRICTION CLUTCH

The invention relates to a shiftable friction clutch for use particularly for driving gears. Said clutch includes a shift collar which is axially movably supported on the shaft to be clutched and includes further at least one axially movable friction ring associated with a clutch half. Said ring cooperates through clutch friction surfaces with the other clutch half and is drivingly connected to the shaft to be clutched through rolling members for producing the contact force by means of surfaces which are arranged on a face remote from the clutch friction surface and are inclined both toward said face and the plane of rotation.

The basic purpose of the invention is to produce a clutch which is shiftable under a predetermined relatively small load. The clutch engagement is commenced in response to a small starting force after which in response to a self-generating effect relatively high torque will be transmitted. The clutch is then disengaged at a predetermined relatively small torque but it will not disengage automatically during idle running.

A further purpose of the invention is to provide a clutch which transmits only a predetermined torque and eliminates amounts in excess thereof so that the gear members cannot be overloaded by an excessive torque. On the other hand, in disengaged condition, there occurs no residual connection between the clutch parts, for example through the effect of springs or another flexible force.

A further purpose of the invention is a clutch which makes it possible to control a driving mechanism substantially consisting of an internal combustion engine and a reversing gear with one single shift lever, that is to engage the clutch and to control the filling of the internal combustion engine with this single shift lever. By using a reversing gear the single gearshift lever can be shifted from the forward to the reverse gear and also the filling of the motor can be controlled.

The basic purpose of the invention is attained by positioning rolling members loosely between wedge surface or surfaces on the friction member and wedge surface or surfaces on the shaft to be clutched by providing the shift sleeve with at least one pressure surface which for starting the torque to be transmitted cooperates with a corresponding counter-pressure surface on the friction ring.

In order to reduce the friction on the pressure surfaces during the starting process, the invention is advantageously further developed in such a manner that the pressure surfaces are inclined at an acute angle to the plane of rotation, which angle is directed oppositely to the inclined surfaces for the rolling members. The inclination of the pressure surfaces results also in an additional tangential auxiliary force which makes it easier for the rolling members to run onto their inclined surfaces. The invention is further more advantageously developed in such a manner that (1) on the gearshift sleeve axially spaced from a first pressure surface there is provided a parallel second pressure surface and (2) on the friction ring axially spaced from its counter pressure surface there is provided also a parallel countersurface which surfaces face one another and (3) that the bodies formed by the mentioned surfaces, for example, a tooth on the friction ring and groove in the shift collar, have axial clearance. The inclination of the countersurfaces results in a reduction of the friction during the disengaging process and assistance for the running off of the rolling members from their inclined surfaces.

The invention is advantageously further developed in such a manner that the counter-pressure surface and the countersurface of the friction ring form a tooth with at least one surface which is directed approximately at a right angle to the plane of rotation, that the first pressure surface and the second pressure surface of the gearshift sleeve form a groove defined by the shift collar and a blocker, whereby the blocker has at least one stop surface which is inclined approximately at a right angle to the plane of rotation and that the surface and the stop surface face one another on the inlet side of the groove. The surface and the stop surface form a block against an unintended starting of the clutch, which is important when the clutch according to the invention, as described later on, is constructed as a double clutch. It is advantageous to equip the clutch according to the invention with several members having pressure surfaces and countersurfaces.

The above-mentioned surfaces or stop surfaces are adaptable according to the invention also as for a double clutch. For the purpose of increased safety in operation, the friction ring or rings are loaded according to the invention with at least one return spring in the direction of the declutching. It is thereby, for reasons of mounting, advantageous to arrange the return springs outside on the friction member or members. It is further advantageous if the rolling members are balls. A simple and therefore inexpensive manufacture is obtained according to the invention in such a manner that the inclined surfaces on the friction ring and/or on the shaft to be clutched are, with reference to the rolling members, concavely curved surfaces, because then the inclined surfaces can be obtained with a simple milling tool. Furthermore, it is advantageous to develop the invention further by a radially operating locking device which holds the shift collar in a disengaged condition with respect to both axial directions and prevents in an engaged condition a movement in direction of disengagement. It is in this connection particularly advantageous when the locking device urges the shift collar in clutch-engaging condition in the direction of a continuation of the engaging movement. In order for the clutch according to the invention to be used for both directions of rotation, it can be constructed to provide two oppositely directed inclined surfaces for each rolling member which operate as loading ramps.

The basic purpose of the invention is also attained by limiting with a flexible force the force with which the clutch friction surfaces are urged against one another. The transmittable torque is particularly so limited according to the invention that the end ring or the end rings is or are loaded by a spring in direction of the clutch engagement and that the axial movement of the end ring(s) is limited with axial clearance by suitable stops (first stop, second stop). The invention further advantageously provides that the axial movement of the friction ring or rings which is (are) moved axially by the rolling members which run onto the inclined surfaces is limited in direction toward the friction surface (in the direction of the clutch engagement) by at least one-third stop. The invention thereby advantageously limits the axial movement of the friction ring or the friction rings earlier by the stop than the movement in the same direction of the end ring or rings.

The invention provides in a simple manner that the stop limits directly one rotational movement of the friction ring or rings and, due to the inclined surfaces, acts indirectly in an axial direction. This permits a limited rotation of the friction ring which is determined by the stop connected to the driving shaft. This simultaneously limits the axial movement of the friction rings which is caused by the rolling members running onto the inclined surfaces.

Furthermore, for meeting the basic purpose of the invention the gearshift sleeve is operated through a shift fork or the like which can be actuated by means of an engaging member provided with at least one shifting surface. This is accomplished by a swingable trip cam or the like which has at least one profile part, for example a profile edge, which contacts the shifting surface during a portion of the shifting process. Said profile part drives the engaging member only through a portion of the entire angle of traverse of the trip cam but permits a further movement of the engaging member of the shift fork and the gearshift sleeve. A profile part is a more or less rounded-off edge.

For the use with reversing gears, the invention further provides that the engaging member has two legs which are arranged in a U-shape, on which legs there are two shifting surfaces positioned opposite to one another, and between which the trip cam is arranged. According to the invention, the trip cam is so constructed that between the engaging member and the trip cam in the zero position, (thus during idle running) a firm locking of the parts is provided while in engaged condition of the clutch, for example for the forward gear or the reverse gear, the engaging member, together with the shift fork connected therewith and the shift collar, has a freedom of movement relative to the trip cam in order to follow same for completing the engaging process. In order to fulfill this condition the invention further provides that the trip cam includes two profile parts, for example profile edges, which in the zero position of the trip cam (idle running of the gearing) contact the adjacent and facing shifting surfaces or have a little clearance with respect to them. Upon movement of the trip cam out of the zero position, the distance between the shifting surfaces is larger than the width of the trip cam, which width falls into the coordinate of the distance. Since the clutch to be shifted has a servo effect, thus operates with an automatic servomotor, during the disengagement it must be operated against a relatively high starting force while during the starting only the relatively small initiating force is required. For this reason, the trip cam is constructed according to the invention in such a manner that it responds during the engagement to a different transmission ratio than during the disengagement.

Accordingly the invention provides that the trip cam has on each side a first profile part, for example a first profile edge, which contacts during a portion of the shifting process the shifting surface, on a radius related to the axis of the trip cam and a second profile part, for example a second profile edge, which contacts the shifting surfaces during a portion of the shifting process, on a smaller radius. Thus, in a starting condition (rotated trip cam) the distance between both first profile parts, for example first profile edges, which distance falls into the coordinate of the distance between both engaging surfaces, is smaller than the distance from the starting first profile part to the disengagement second profile part. The trip cam is further advantageously constructed in such a manner that the two first profile parts, for example profile edges, are connected by a circular arc centered on the pivot point of the trip cam.

In order for the locking to be releasable, a locking pin is provided with a point or a cone on the front side with which it is positioned in a corresponding recess — bore or groove. As long as the inclined surfaces can act onto one another, the locking elements tend to return into the initial position, thus to disengage the clutch again. In addition, the clutch according to a modification of the invention is provided with a locking pin which initiates the starting process with inclined surfaces. For the operation of the clutch it is therefore of importance that the locking is released quickly. For this reason the shifting device according to the invention further provides that the central position of the trip cam can be fixed relatively to the engaging member by a locking pin engaging a recess, whereby the one of the mentioned parts is arranged in the cam eccentrically to its pivot axis and the other part is arranged in the engaging member.

Further characteristics and advantages of the invention are disclosed in the following description.

The invention is discussed in connection with FIGS. 1 to 13.

In the embodiment shown in FIG. 6 many of the parts are identical to those already described in connection with FIGS. 1–5, no further description thereof will be needed or presented. Parts different from those in FIGS. 1–5 are identified by different numerals.

Figure 1:
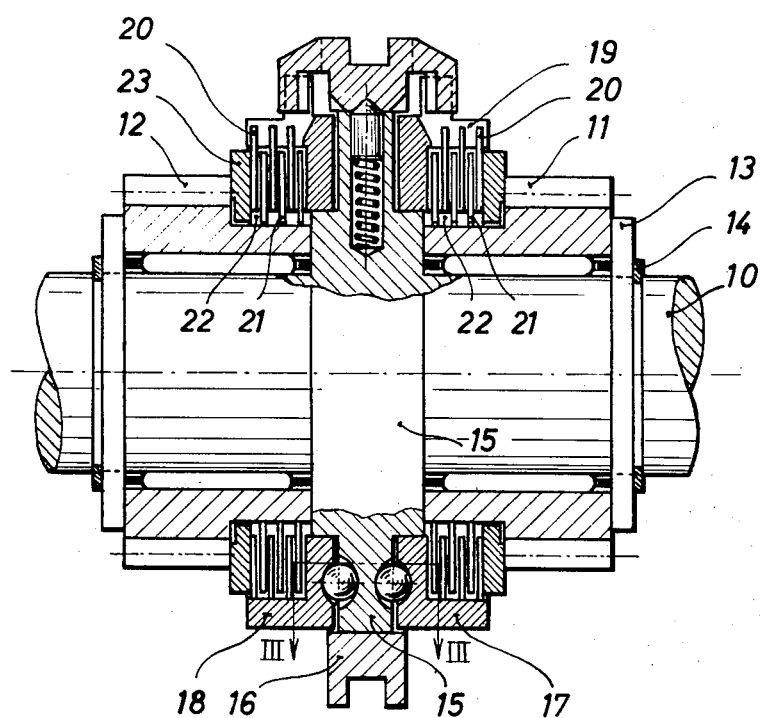
FIG. 1 is a longitudinal central cross-sectional view of an exemplary embodiment of the invention.

FIG. 1 illustrates a double clutch according to the invention. A shaft 10 is connected through gears 11, 12 selectively to said clutch. The gears are rotatably supported on the shaft and are held axially by suitable means, for example disks 13 and snap rings 14. The shaft is provided with a flange or the like between the two gears, which flange serves as carrier 15 for the shift collar. The carrier can also be placed on the shaft and can be fastened thereon. A shift collar 16 is longitudinally movably guided on said carrier. It is secured against rotation on the carrier by means which are not illustrated. A friction ring 17, 18 is centered rotatably on each side of the carrier. The outside diameter of the friction rings corresponds to the outside diameter of the carrier. The friction rings are provided in a conventional manner with recesses 19 for receiving the outer clutch plates 20. The outer clutch plates cooperate, as known, with inner clutch plates 21 which engage by internal splines corresponding external splines 22 of the gears 11, 12. The thus formed clutch units are each supported axially outwardly by an end ring 23. The friction ring or rings are provided on the front side facing the sleeve carrier with a recess or preferably with several recesses 24 (FIG. 2) which have in peripheral direction to one side a flat inclined surface 25 and to the other side a step surface 26 or a surface which is at a right angle to the front side. Each sleeve carrier is provided opposite the mentioned recesses with a recess 27 which also has a flat inclined surface 28 and a steep surface 29. While the one inclined surface is directed to the one side, the other inclined surface is directed to the other side. A rolling member, preferably a ball 30, is positioned in each of the two recesses and thus between the friction ring and the carrier. When the friction ring and sleeve carrier are rotated relative to one another, the balls 30 can run onto the flat inclined surfaces which serve as ramps and can thereby press the friction ring or rings away from the sleeve carrier and can thereby compress the above-mentioned clutch plates. Through this, the gears are coupled with the shaft through the clutch plates, the respective friction ring, the respective balls and the sleeve carrier.

The friction ring 17 is (or the friction rings 17, 18 are) urged toward the sleeve carrier by one or two return springs 31. A particular advantage of the invention is that the spring or the springs are arranged outside on the periphery of the friction ring or rings and are constructed as coiled flat springs, so-called hairpin springs or U-shaped springs. Projections 32 are provided on the periphery of the friction rings 17 and 18 for suspending the springs.

The following description of the gearshift sleeve and its cooperation with the friction rings refers to the example of a double clutch. The described parts can easily be modified for use as a single clutch.

Figure 2:
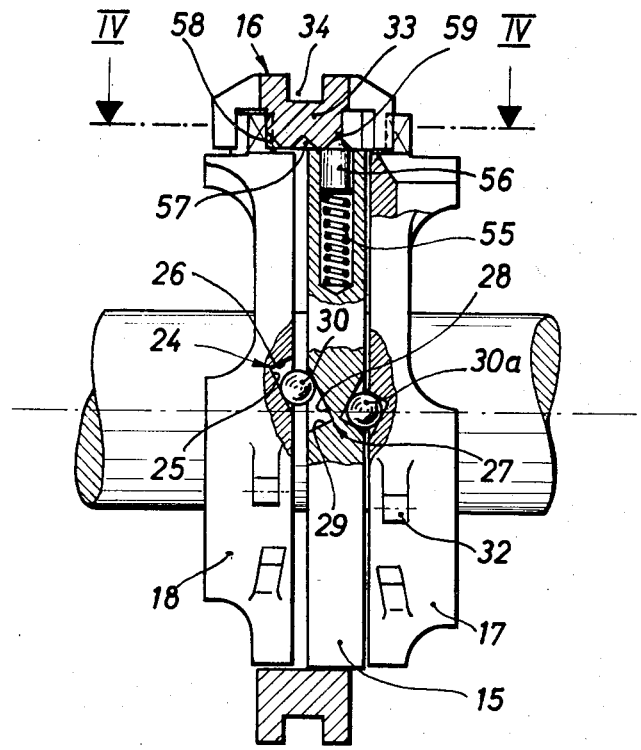
FIG. 2 is partly a front and partly a central cross-sectional view of a detail of the clutch according to FIG. 1, and illustrates as a detail the arrangement of the rolling members.
Figure 4:
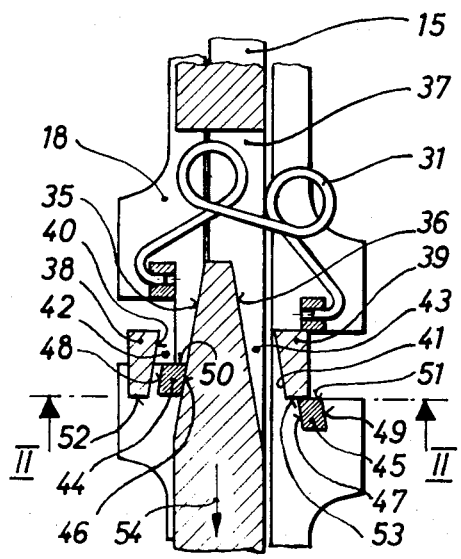
FIG. 4 is a cross-sectional view along the line IV—IV of FIG. 2 and illustrates schematically a shifting phase.
Figure 5:
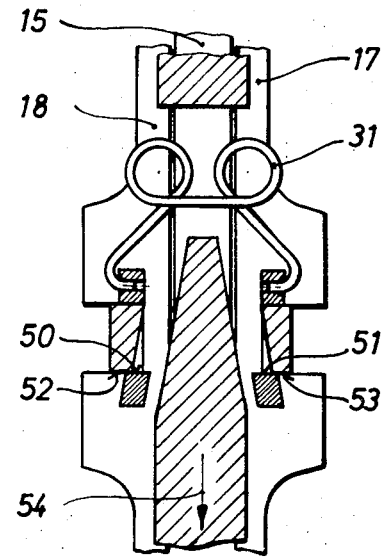
FIG. 5 illustrates schematically a different shifting phase.

The shift collar 16 consists of a circular member which is provided outside on the periphery with an annular groove 34 for a conventional (hence not illustrated) shift fork. On the inner periphery, the member is provided on the front side with two inclined surfaces which taper toward the center, which surfaces are called first pressure surfaces 35, 36 (FIG. 4). When the inclined surfaces 25 of the friction members, which surfaces serve as a ramp for the rolling members, are sloped to a certain peripheral direction, enlarging the recess 24, then the first pressure surfaces 35, 36 taper in the same direction towards each other and may come together in the central plane of the sleeve member. Openings 37 follow the part of the sleeve member which forms the first pressure surfaces, which openings receive the return springs 31. Axially spaced from first pressure surfaces 35, 36, blockers 38, 39 are provided on the collar member, which blockers provide on the side facing the first pressure surfaces the second pressure surfaces 40, 41. Said latter pressure surfaces are parallel to said first pressure surfaces. Thus, the sleeve member and the bars form inwardly open grooves 42, 43. Teeth 44, 45 are provided in the periphery of the friction member, which teeth are each provided on the side facing the gearshift sleeve with a so-called counter pressure surface 46, 47. Said last-named surfaces are positioned parallel to the aforementioned pressure surfaces on the collar member. On the other side, the teeth are provided with countersurfaces 48, 49 which are each positioned parallel to the respectively facing countersurface on the blocker. The grooves 42, 43 are wider in axial direction than the teeth 44, 45. On the side facing the blocker, the teeth are provided with a surface 50, 51 which is directed at least approximately rectangularly to the plane of rotation (direction of rotation). On the side facing the teeth, the blockers 38, 39 are provided with a stop surface 52, 53 which is also directed approximately rectangularly to the plane of rotation. A latch pin 56 which is loaded by a spring 55 is guided radially movably into the sleeve carrier. A locking opening 57 is provided in the center of the sleeve member to lock the gearshift sleeve in off condition. Two laterally open, thus half, locking openings 58, 59 are provided on the front sides of the gearshift sleeve for fixing the two starting conditions. The operation is as follows:

It is assumed that the shaft rotates in FIGS. 1 and 2 clockwise as viewed from the left. This corresponds to a movement of the shift collar in the direction of the arrows 54 in FIGS. 4 and 5. FIG. 5 illustrates the sleeve and the friction rings in disengaged condition. The friction rings are pressed against the collar carrier 15 by the return springs 31, the rolling members are positioned in the lowermost points of the recesses 25, as illustrated by reference numeral 30a in FIG. 2. A relative movement between the shift collar 16 and the friction rings 17 and 18 is prevented by the surfaces 50, 51 and stop surfaces 52, 53 of the teeth and blockers. When the left clutch is to be started, the gearshift sleeve 16 is moved to the left (FIG. 4). The lock of blocker 39 and tooth 45 is thereby maintained on the right side, but the lock on the left side is released. The first pressure surface 35 contacts simultaneously the counter pressure surface 46 and moves the friction ring 18 slightly leftwardly. This provides a preclutching, namely, the inner and outer clutch plates which contact one another rotate the friction ring opposite the direction of the arrow 54 relatively to the sleeve member. This causes the ball 30 to run onto the ramp of the flat inclined surface 25 and to compress the clutch plates. This completes the clutch engagement. Due to the inclination of the pressure surfaces, their friction is minimized, furthermore the friction supports the relative movement, namely the loading of the rolling members onto the ramp 25.

For disengaging the clutch, the gearshift sleeve 16 is moved to the right. The second pressure surfaces 40 thus contact the countersurfaces 48, the clutch plates are opened, the friction ring 18 is moved along by the sleeve carrier over the ramp 25 and, supported by the inclination of the countersurfaces and by the spring 31, the rolling members 30 leave the ramps 25, 28 and are placed again in the lowermost point of the recesses. The declutching process is thus completed.

Figure 3:
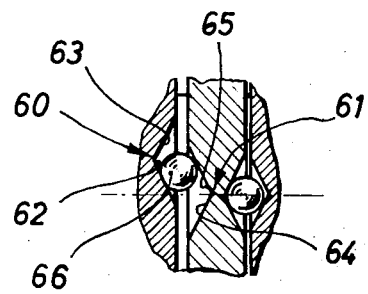
FIG. 3 illustrates as a detail a different exemplary embodiment of the invention which relates to the rolling members (balls) positioned between inclined surfaces, as shown on line 3—3 in FIG. 1.

FIG. 3 illustrates an exemplary embodiment for the arrangement of the recesses 60, 61 for a clutch with clockwise and counterclockwise rotation. The recesses have each two flat inclined surfaces 62, 63, 64, 65 so that the rolling members 66 can run onto a ramp in both directions of rotation. The pressure surfaces and the surfaces and countersurfaces are then doubled in a mirror condition, whereby the pressure surfaces and countersurfaces are preferably not inclined to the plane of rotation.

An advantageous embodiment of the invention is obtained if the flat inclined surfaces on the friction ring or rings and on the sleeve carrier, in relation to the rolling member, are concavely curved surfaces. This has two advantages. A slot drill or the like can be used, the axis of rotation of which is positioned at a right angle to the steep surface 26 or 29. This simplifies the manufacture. On the other side, this reduces the contact stress.

Figure 6:
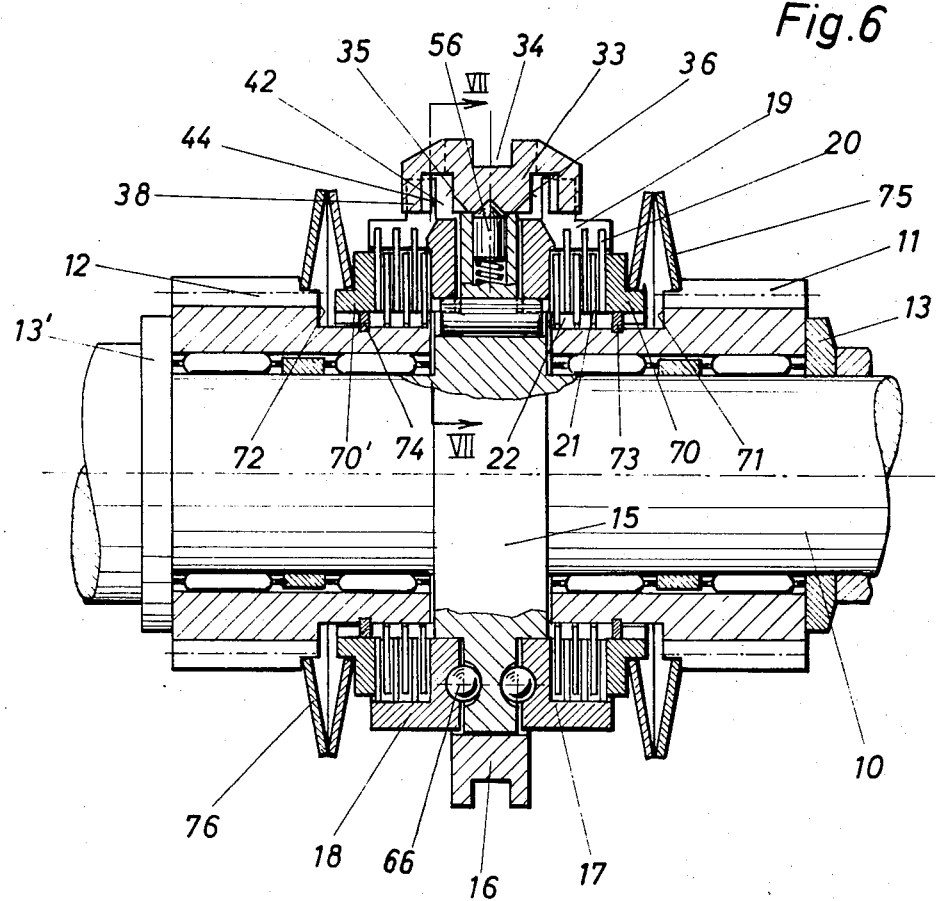
FIG. 6 is a longitudinal cross-sectional view of a clutch according to a different embodiment of the invention.
Figure 7:
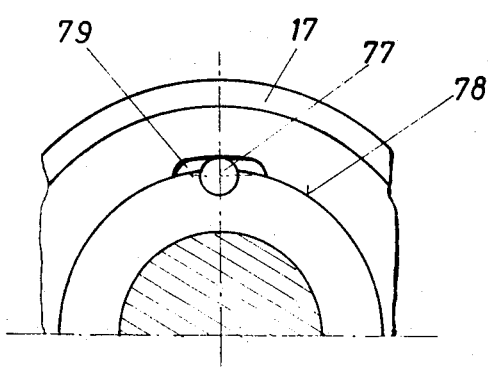
FIG. 7 is a cross-sectional view of the stop device according to the embodiment as shown on line 6—6 in FIG. 6.
Figure 8:
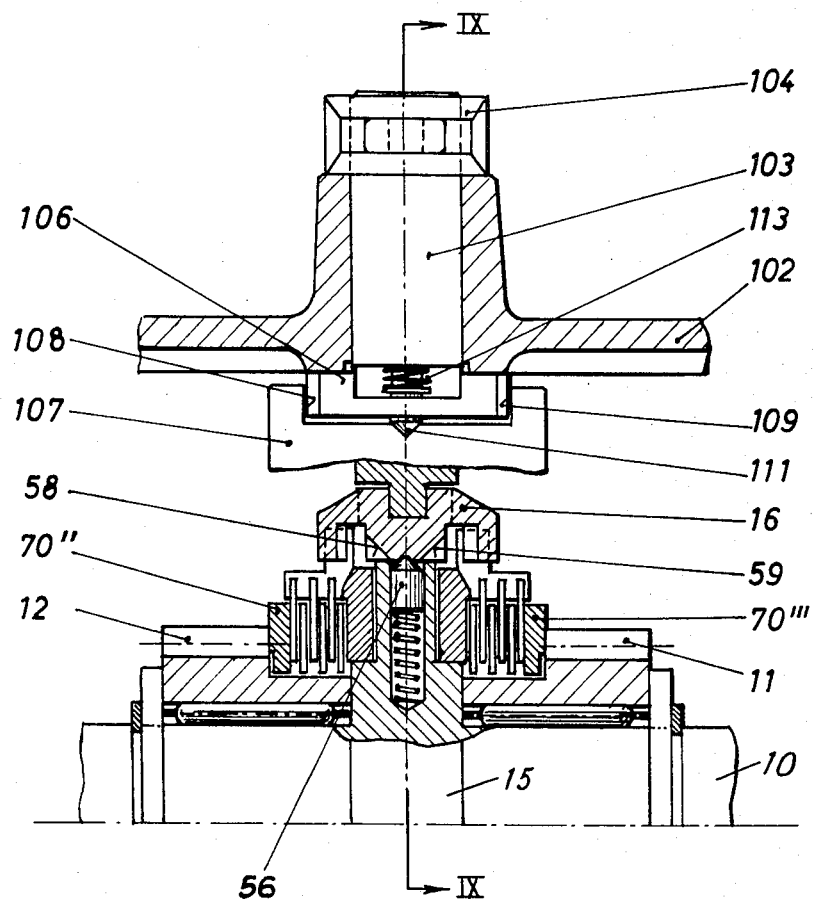
FIG. 8 illustrates a shifting device according to an embodiment of the invention.

FIG. 6 illustrates a different exemplary embodiment of the invention, namely as a double clutch. With this clutch, the shaft 10 must be connected selectively to the gears 11, 12 which are supported rotatably on the shaft and are held axially by suitable means, for example by disks 13 or a shoulder 13'. Between the two gears the shaft is provided with a flange or the like which serves as a carrier 15 for the shift collar. The carrier can also be placed onto the shaft and can be secured thereon. A shift collar 16 is longitudinally movably guided on the carrier therefor. The shift collar is secured against rotation on the carrier by any conventional means (not illustrated). A friction ring 17, 18 is centered rotatably on each side of the carrier. The outside diameter of the friction rings corresponds to the outside diameter of the carrier for the shift collar. The friction rings are provided in a conventional manner with recesses 19 for receiving the external splines of so-called outer clutch plates 20. The outer clutch plates cooperate, as known with so-called inner clutch plates 21 which engage with an internal splines a corresponding external splines 22 of the gears 11, 12. The thus formed clutch units are each supported axially outwardly by a pressure plate 70.

The friction ring or rings and the collar are here provided with recesses on the sides facing each other identical to the recess 60, 61 described above in connection with FIG. 3. Each one of the recesses has two flat inclined surfaces similar to the surfaces 62, 63, 64, 65. The rolling members, preferably balls, are positioned therebetween. When friction ring and sleeve carrier are rotated relatively against one another, the balls can run onto the flat inclined surfaces which in this manner serve as a ramp and can thereby press the friction ring or the friction rings away from the sleeve carrier and can thereby compress the above-mentioned clutch plates. Through this the gears are coupled to the shaft through the clutch plates, the respective friction ring, the respective balls and the sleeve carrier. Alternatively, the recesses can also be constructed such that the rolling members can roll onto the ramp only in one direction of rotation as previously described.

The friction ring 17 is (or the friction rings 17, 18 are) urged with one or more return springs, as described above, toward the sleeve carrier. A particularly advantageous embodiment is that the spring or springs are arranged outside on the periphery of the friction ring or the friction rings and are constructed as coiled flat springs, so-called hair pin springs or U-shaped springs. Projections are provided on the periphery of the friction rings for suspending the springs.

The gearshift sleeve 16 and the friction rings 17, 18 are provided with grooves 42 and teeth 38 which form in the above-described manner first pressure surfaces 35, 36, second pressure surfaces 40, 41, counterpressure surfaces 46, 47, countersurfaces 48, 49, surfaces 50, 51 and stop surfaces 52, 53. The operation of these elements has also been described above. A latch pin 56 is guided in the sleeve carrier. The operation of said latch pin has also been described above The embodiment (FIG. 6) of the clutch is provided with pressure plates 70 which are arranged, with axial clearance, axially with respect to the inner and outer clutch plates. The clearance is limited on one side by a shoulder 71, 72 formed by the gear or gears 11, 12 and on the other side by each of snap rings 73, 74 or the like. The pressure ring or the pressure rings are loaded by Belleville springs 75, 76 in the direction of the clutch engagement. However, the snap rings are arranged in such a manner that the clutch plates are not compressed by the pressure ring when the friction rings 17, 18 are declutching. One or more pins 77 is (are) arranged in the gearshift sleeve carrier 15 in such a manner that the axis of each is positioned parallel to the axis of rotation. Furthermore the pins are so arranged that one half of their periphery lies in the central portion 78 of the friction ring or rings, while the other part projects out therefrom. The friction ring or rings are provided with a recess 79 on their periphery which faces the central portion 78, which recess embraces the pin or the pins. Said pin or pins operate as stops for the respective friction rings which can thus rotate only over a limited angle. Since during the clutching, the rolling members run onto the ramps, the friction ring requires a movability in a circumferential direction to permit its axial movement. Since on the other hand, the pin limits this movability as a stop, it serves as a stop also for the axial movement. During the clutch engagement the friction ring does not urge the clutch plates against a fixed end ring but against resilient pressure plate 70 or 70'. The maximum friction force and with it the maximum transmittable torque thus depends on the tension of the spring 75 or 76.

Thus, it is not possible with the clutch of the invention to exceed the predetermined overload moment by impacts, as it can occur otherwise during the shifting at high rotational speeds or in boat gearings for example when the ground is contacted. Due to the construction of the invention, the spring, when in declutched condition, cannot act on the clutch plates because it is held axially on both sides and the spring deflection is limited in the direction of the clutch plates.

FIGS. 8 to 13 illustrate as a further embodiment of the invention a double clutch to which a shaft 10 must be connected selectively with gears 11, 12, which gears are supported rotatably on said shaft and are held axially by suitable means, for example disks or a shoulder, as above described. The shaft is provided with a flange or the like between the two gears, which flange forms the above-mentioned shift collar carrier 15 on which the shift collar 16 is guided longitudinally movably. On both sides of the carrier, there are provided friction rings 17, 18, outer and inner clutch plates 20, 21 and pressure plates 70', 70''' which are, in this embodiment, fixedly supported on the gears 11, 12. These parts cooperate according to the invention in the above-described manner.

Figure 9:
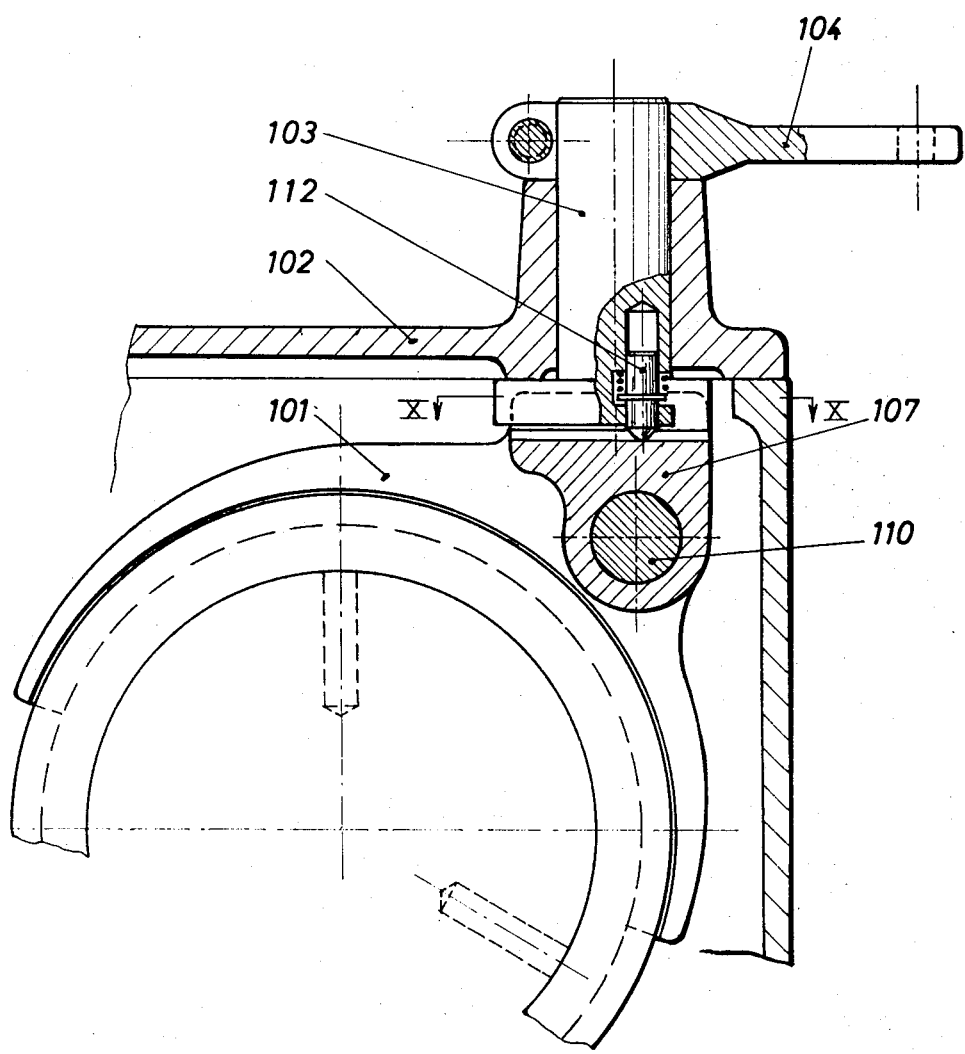
FIG. 9 is a cross-sectional view of the shifting device according to this embodiment of the invention, as shown on line 9—9 in FIG. 8

The shift collar 16 consists of a sleeve member 33 which is provided on its periphery with an annular groove 34 for the shift fork 101 (FIG. 9). In the housing or in a housing cover 102, there is supported rotatably but not longitudinally movably a control shaft 103. An operating lever 104 is secured on the outside by known means with which lever the clutch is operated. The control shaft carries a trip cam 106 within the housing, which trip cam engages an engaging member 107. Said trip cam has a U-shaped construction which is described in more detail hereinafter and is provided with two oppositely positioned shifting surfaces 108, 109 on the U legs, which shifting surfaces receive the trip cam between one another. The engaging member forms one piece with the shift fork 101 which is guided longitudinally movably on the shift rod 110. The shift fork engages the annular groove 34. The engaging member is provided with a recess 111, which is tapered inwardly to a point, which recess extends at a right angle to the direction of movement of the shift fork. A retention pin 112 which is pointed at its front end engages the recess in the zero position of the gearshift lever. The retention pin is supported off-center but axially parallel and longitudinally movably in the shift lever 103. It is urged constantly with its pointed end into the tapered recess. The retention ring is, in reference to the axis, arranged according to the invention on the side of the control shaft which is positioned opposite the effective profile parts of the trip cam which is described more in detail. Through this the retention pin moves toward a different side than the engaging member and thus into the recess during the movement of the operating lever. This achieves a very rapid release of the locking and the locking bolt 56 is not prevented by such locking from permitting the starting process by sliding on the inclined surfaces.

Figure 10:
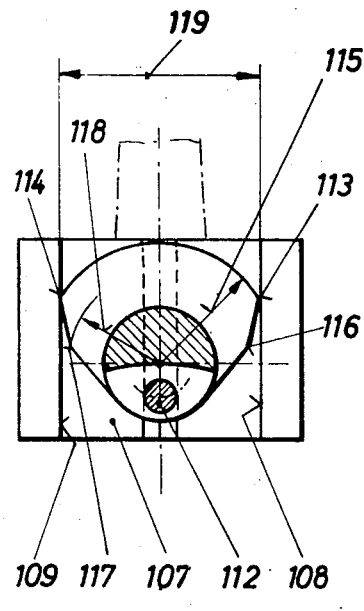
FIG. 10 illustrates a trip cam and an engaging member according to the embodiment of the invention in zero adjustment (idle running), as shown in line X—X in FIG. 9
Figure 11:
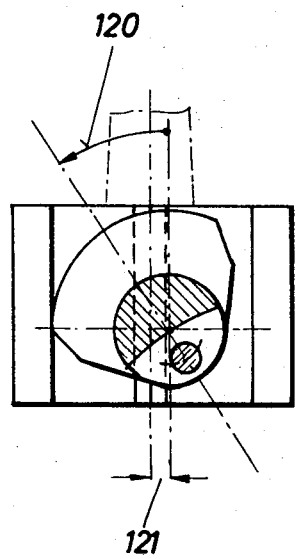
FIG. 11 illustrates the trip cam and the engaging member in a starting phase.

FIGS. 10 to 13 illustrate the shaping of the trip cam according to the invention and its operation. The trip cam has on each side first profile edges 113, 114 which are, with reference to the axis of the trip cam or the control shaft, positioned on the same radius 115. The trip cam has in addition on each side a second profile edge 116, 117, which profile edges are arranged on a smaller radius. The profile edges may be more or less rounded off so that they can also be identified as "profile part" instead of "profile edge". FIG. 10 illustrates the trip cam in zero position, namely during idle operation of the driving mechanism. The distance between the two first profile edges 113, 114 is so chosen that the trip cam fits between the two shifting surfaces without clamping. If the trip cam is swung through an angle 120 for engagement of the clutch, then the engaging member 107 and with it the shift fork 101 are moved to the same side. The pressure surface 35 engages the countersurfaces of the friction ring 18. The locking pin 112 is simultaneously moved the distance indicated at 121. The engagement of locking pin and recess is released so that starting with this shifting phase (FIG. 11), shift lever with trip cam on one side and shift fork with engaging member on the other side are independent from one another. The operating lever or the trip cam can be further swung in direction of the initial angle range 120. The trip cam thereby does not act onto the engaging member 107 because the two first profile edges are connected by a radius centered at the axis. The first profile edges could also be connected by a straight line or another line or surface which does not exceed the mentioned radius.

Figure 12:
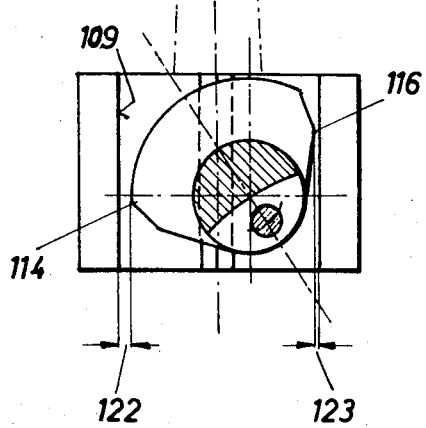
FIG. 12 illustrates a further starting phase.
Figure 13:
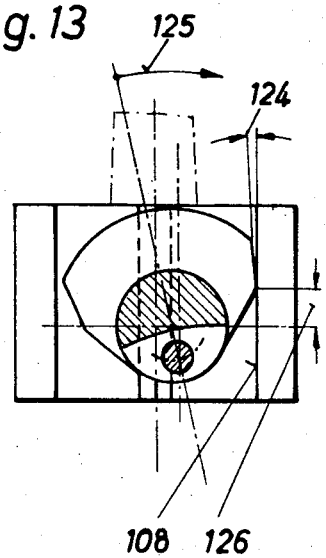
FIG. 13 illustrates an off phase.

Due to the effect of the pressure surface 35, the rolling members 66 start to operate which move the respective friction ring 18 in the direction of the engagement. A clearance 122 is created between the trip cam and the surface 109 of engagement on the starting side, while the clearance 123 is reduced on the other side (FIG. 12). During the swinging of the operating lever (FIG. 13) in direction of the arrow 125, the trip cam contacts the shifting surface 108. The trip cam is formed according to the invention in such a manner that the second profile edge which is arranged on the smaller radius first contacts the shifting surface. More specifically, the second profile edge and the first profile edge are connected to a profile flank in such a manner that according to the invention an angle 124 starting at the second profile edge is formed between the shifting surface and the profile flank. Thus, the declutching process starts at a relatively small lever arm 126 and thus with a favorable transmission ratio from the operating lever to the engaging member. Only when the angle range 124 has been covered, the declutching process changes from the second to the first profile edge until finally the idle-running position (FIG. 10) is achieved.

It is assumed that the above-described process corresponds to the forward gear, then the engagement of the reverse gear is accomplished in reverse manner.

Thus, the basic principle of the invention consists in a trip cam which, when the clutch is disengaged and the driving mechanism thereby runs idle, is arranged without clearance, or only a small clearance, between the shifting surfaces of a shift fork which shifting surfaces are arranged U-shaped; while in the engaged condition clearance is provided between the shifting surfaces on one side and the trip cams on the other side so that the automatic clutch and the shift lever connected to the trip cam can move independently from one another.

The embodiments of the invention in which an exclusive property or privilege is claimed are defined as follows:

1. In a shiftable friction clutch having a pair of clutch halves, a shift collar which is axially movably supported on a shaft to be clutched and at least one axially movable friction member which belongs to one clutch half and cooperates through clutch friction surfaces with the other clutch half and is supported on the shaft to be clutched through rolling members for producing the contact force by means of surfaces which are arranged on a surface remote from the clutch friction surface and are inclined toward said remote surface and the plane of rotation, wherein the improvement comprises opposed inclined surfaces in said movable friction member and said shift collar, said rolling members being positioned loosely between the inclined surfaces of said movable friction member and said shift collar, said shift collar having at least one first pressure surface which for starting the torque to be transmitted cooperates at times with a corresponding first counter pressure surface on said friction member, at least one second pressure surface on said shift collar axially spaced from said first pressure surface and a second counter pressure surface facing said second pressure surface, said first and second pressure surfaces and said first and second counter pressure surface being defined by surfaces on teeth on said friction member and said shift collar, said teeth on said friction member and said shift collar having an axial clearance therebetween to define a groove.

2. A clutch according to claim 1, wherein the first pressure and the first counter pressure surfaces are inclined at an acute angle toward the plane of rotation, which angle is directed opposite to the inclined surfaces for the rolling members.

3. A clutch according to claim 1, wherein the first counter pressure surface and the second counter pressure surfaces of the friction member form teeth each having at least one surface which is directed approximately at a right angle to the plane of rotation, that the first pressure surface and the second pressure surface of the shift collar form a groove which is defined by the shift collar member and a blocker, whereby the blocker has at least one stop surface which is inclined approximately at a right angle to the plane of rotation and that the surface and the stop surface face one another on the inlet side of the groove.

4. A clutch according to claim 1, wherein the friction ring is loaded with spring means comprising at least one return spring in direction of the declutching, said return spring being constructed as a coiled flat spring and is arranged outside the circumference of the friction member.

5. In a shiftable friction clutch having a pair of clutch halves, a shift collar which is axially movable supported on a shaft to be clutched and at least one axially movable friction member which belongs to one clutch half and cooperates through clutch friction surfaces with the other clutch half and is supported on the shaft to be clutched through rolling members for producing the contact force by means of surfaces which are arranged on a surface remote from the clutch friction surface and are inclined toward said remote surface and the plane of rotation, wherein the improvement comprises an end ring of the friction member being loaded by spring means in direction of the clutch engagement and that the axial movement of the end ring is limited with axial clearance by stops.

6. A clutch according to claim 5, wherein the axial movement of the friction member which is moved axially by the rolling members which run onto the inclined surfaces is limited in direction toward the friction surface in the direction of the clutch engagement by at least one third stop.

7. A clutch according to claim 6, wherein the axial movement of the friction member is limited earlier by the third stop than the movement in the same direction of the end ring.

8. A clutch according to claim 6, wherein the third stop limits directly one rotational movement of the friction member and, due to the inclined surfaces, acts indirectly in axial direction.

9. A friction clutch, particularly for gears, comprising:
   a shift collar which is axially movably supported on a shaft to be clutched;
   at least one axially movable friction ring which belongs to a clutch half which cooperates through clutch friction surfaces with an other clutch half, the friction ring being axially supported on the shaft to be clutched by rolling means which are arranged between two opposite surfaces respectively which are arranged on the front surface of the shaft and the friction ring respectively and which are inclined to the plane of rotation, to produce a pressure force which depends on the torque;
   at least one blocker which forms with one of the shift collar and the friction ring a groove in the direction of rotation; and
   at least one tooth on one of the friction ring and the shifting collar, which is intermeshable in said groove, the groove and the tooth having radial surfaces which cooperate during declutching and which are inclined to the plane of rotation in an opposite direction as said opposite surfaces.

10. A clutch according to claim 9, wherein the spring means is at least one Belleville spring.

11. In a shiftable friction clutch having a pair of clutch halves, a shift collar which is axially movable supported on a shaft to be clutched and at least one axially movable friction member which belongs to one clutch half and cooperates through clutch friction surfaces with the other clutch half and is supported on the shaft to be clutched through rolling members for producing the contact force by means of surfaces which are arranged on a surface remote from the clutch friction surface and are inclined toward said remote surface and the plane of rotation, wherein the improvement comprises said shift collar being operated through a gearshift fork which can be driven by means of an engaging member having at least one shifting surface by a swingable trip cam which has at least one profile part, said profile part contacting the shifting surface during a portion of the shifting process, said profile part driving the engaging member only on a portion of the entire angle of traverse of the trip cam but permits a further movement of the engaging member or the gearshift fork and the shifting collar.

12. A clutch according to claim 11, wherein the engaging member has two U-shaped arranged legs on which there are two shifting surfaces positioned opposite to one another and between which the trip cam is arranged.

13. A clutch according to claim 12, wherein the trip cam is formed in such a manner that two profile parts, for example profile edges are formed which in the zero position of the trip cam contact the shifting surface which have little clearance to them and that at a swinging of the trip cam, which swinging differs from the zero position, the distance between the shifting surfaces is larger than the width of the trip cam, which width falls into the coordinate of the distance.

14. A clutch according to claim 11, wherein the trip cam has on each side a first profile part, for example a first profile edge, which contacts during a portion of the shifting process the shifting surface, on a radius related to the axis of the trip cam and a second profile part, for example a second profile edge, which contacts the shifting surfaces during a portion of the shifting process, on a smaller radius, and wherein in a starting condition the distance between both first profile parts, for example first profile edges, which distance falls into the coordinate of the distance between both engaging surfaces, is smaller than the distance from the starting first profile part to the releasing second profile part.

15. A clutch according to claim 11, wherein the two first profile parts, for example profile edges are connected by a circular arc drawn from the pivot point of the trip cam.

16. A clutch according to claim 11, wherein the central position of the trip cam can be fixed relatively to the engaging member by a locking pin engaging a recess, whereby the one of the mentioned parts is arranged in the cam eccentrically to its pivot axis and the other part is arranged in the engaging member.

17. In a shiftable friction clutch for at least one gear having a pair of clutch halves, a shift collar which is axially movable supported on a shaft to be clutched and at least one axially movable friction member which belongs to one clutch half and cooperates through clutch friction surfaces with the other clutch half and is supported on the shaft to be clutched through rolling members for producing the contact force by means of surfaces which are arranged on a surface remote from the clutch friction surface and are inclined toward said remote surface and the plane of rotation, wherein the improvement comprises an end ring of the friction member being loaded by spring means in a direction of the clutch engagement, said spring means being arranged between said friction member and said gear.

* * * * *